United States Patent [19]

Clark

[11] Patent Number: 4,502,587
[45] Date of Patent: Mar. 5, 1985

[54] AUTOMATIC ACCUMULATOR FOR RECTANGULAR ARTICLES

[75] Inventor: Douglas C. Clark, Winston-Salem, N.C.

[73] Assignee: R. J. Reynolds Tobacco Company, Winston-Salem, N.C.

[21] Appl. No.: 486,112

[22] Filed: Apr. 18, 1983

[51] Int. Cl.³ ............................................... B65G 1/00
[52] U.S. Cl. .................................................... 198/347
[58] Field of Search ........................... 198/347; 414/37

[56] References Cited

U.S. PATENT DOCUMENTS

| | | | |
|---|---|---|---|
| 3,360,100 | 12/1967 | Seragnoli | 198/347 |
| 3,527,366 | 9/1970 | Gamberini | 414/37 |
| 3,532,387 | 10/1970 | Stancari | 198/347 |
| 3,937,335 | 2/1976 | Lanham et al. | 414/347 |

FOREIGN PATENT DOCUMENTS

2103168 2/1983 United Kingdom ................ 198/347

*Primary Examiner*—Joseph E. Valenza
*Assistant Examiner*—Michael Stone
*Attorney, Agent, or Firm*—Joseph E. Root, III

[57] ABSTRACT

Apparatus to accumulate automatically articles traveling between downstream and upstream machines in a production line. The accumulator includes an input magazine, a bin, and an output magazine. When the downstream machine ceases operation, a vertical plunger feeds articles into the input magazine, forming a stack. A loading plunger pushes the completed stack into the bin, where multiple stacks may be held, the stacks being moved from one position to another within the bin by a powered belt. To feed articles from the accumulator back into the production line, a stack is moved into the output magazine. There, a discharge plunger feeds successive lowermost articles in the output magazine onto an output conveyor. The output conveyor has at least twice the throughput capacity as the upstream machine, and articles from the accumulator may be merged into the production line stream, thus making up production time lost during shutdown of the downstream machine.

3 Claims, 11 Drawing Figures

CARTONING OUTPUT

FIG. 5B.

VERTICAL PLUNGER

FIG. 5C.

LOADING PLUNGER

FIG. 5D.

BELT

FIG. 5E.

DISCHARGE PLUNGER

AUTOMATIC ACCUMULATOR FOR RECTANGULAR ARTICLES

BACKGROUND OF THE INVENTION

This invention relates generally to apparatus for enabling a production line to maintain a constant output. More particularly, the invention relates to accumulator apparatus which gathers articles during the time when a downstream machine is inoperative, and automatically feeds such articles back into the production stream when the downstream machine resumes production.

Multi-stage production lines must allow for situations in which one stage of the line is inoperative, but other stages are capable of continued operation. Lacking such provision, the entire line would cease operation every time a single component experienced and interruption. Obviously, that situation is intolerable. The need, therefore, can be expressed in general terms as the requirement to provide for a reservoir. or accumulation, between downstream and upstream stages of operation. When the upstream stage is inoperative, the reservoir receives output from the downstream stage, allowing that stage to continue operation. When the downstream stage is inoperative, similarly, the reservoir supplies the downstream stage with input, allowing that stage to continue operation. By alternately absorbing and supplying articles, the reservoir allows for interruptions in the operation of individual components without shutting down the entire production line.

Industries concerned with handling rectangular-shaped, relatively small articles—such as the cigarette industry—have met this need in a number of ways. The most common solution is to provide apparatus which stacks output from a downstream machine into a vertical magazine; stored articles are then manually unloaded and fed back into the production stream. The requirement for manual unloading obviously is undesirable, as it necessitates high labor costs and slows down production. Additionally, such accumulators have limited capacity and thus can be overloaded easily.

This problem is manifested, of course, at several stages in the manufacturing process for cigarettes. Between the cigarette packaging machine (which wraps cigarettes in paper and foil packages) and the cartoning machine (which places packages within cartons, generally at ten packages per carton), a solution to the accumulation problem is presented by Seragnoli, U.S. Pat. No. 3,360,100. When the downstream (cartoning) machine is interrupted, this mechanism accumulates packages by lifting packs upward into a vertical magazine through the operation of a plunger. When the downstream machine resumes operation, the accumulator holds the packages thus inserted until the upstream (packaging) machine is interrupted, whereupon it discharges packages toward the downstream machine until the upstream machine resumes operation.

Devices such as that disclosed by Seragnoli, however, leave two problems unsolved. First, production time lost during interruption of the downstream machine cannot be made up. That is, no provision exists in the prior art for combining the output of an accumulator with the output of the upstream machine to increase throughput after the downstream machine resumes operation. The downstream machine can be supplied either from the accumulator or from the upstream machine, but not from both. Second, such devices assume that the upstream and downstream machines will be interrupted for approximately equal times. The accumulator can be emptied only during interruptions of the upstream machine; thus, if the upstream machine in fact is less prone to malfunction than is the downstream machine, there will be a net addition to the accumulator. At some point, the accumulator will be filled to capacity, requiring a deliberate stoppage of the upstream machine in order to empty the accumulator at least partially.

At the stage of cigarette manufacturer between the cartoning machine and the casing machine (which loads cartons into cases for shipment), these problems present serious drawbacks to use of the Seragnoli-type device. First, the throughput of the casing apparatus is greater than that of the cartoning machine; thus, if such apparatus were available, the casing apparatus could accept input from both an accumulator and from the cartoning machine, allowing for lost production time to be made up. Second, the casing machine and its associated conveyor apparatus are in fact more prone to downtime than is the cartoning machine. Thus, an accumulator rapidly would fill to capacity.

The need still exists, therefore, for an accumulator capable not only of receiving articles from an upstream machine and discharging articles to a downstream machine, but also capable of merging its output into a continuing stream of articles. It is that need to which the present invention is addressed.

SUMMARY OF THE INVENTION

The broad object of the present invention is an accumulator, located between upstream and downstream machines, capable of allowing the downstream machine to make up lost production.

A further object of the present invention is to provide an accumulator for rectangular articles.

Another object of this invention is to provide apparatus for accumulating the output of a cigarette cartoning machine, capable of merging its output with a stream of cigarette cartons flowing from a cartoning machine to a casing machine.

A specific object of the present invention is to provide apparatus for accumulating cigarette cartons, located between a cartoning machine and a casing machine, capable first of accumulating cigarette cartons when the casing machine is interrupted, feeding cartons to the casing machine when the cartoning machine is interrupted, and merging cartons in the flow of articles from the cartoning machine to the casing machine, allowing the casing machine to make up lost production.

DETAILED DESCRIPTION OF A PREFERRED EMBODIMENT

Figure 1:
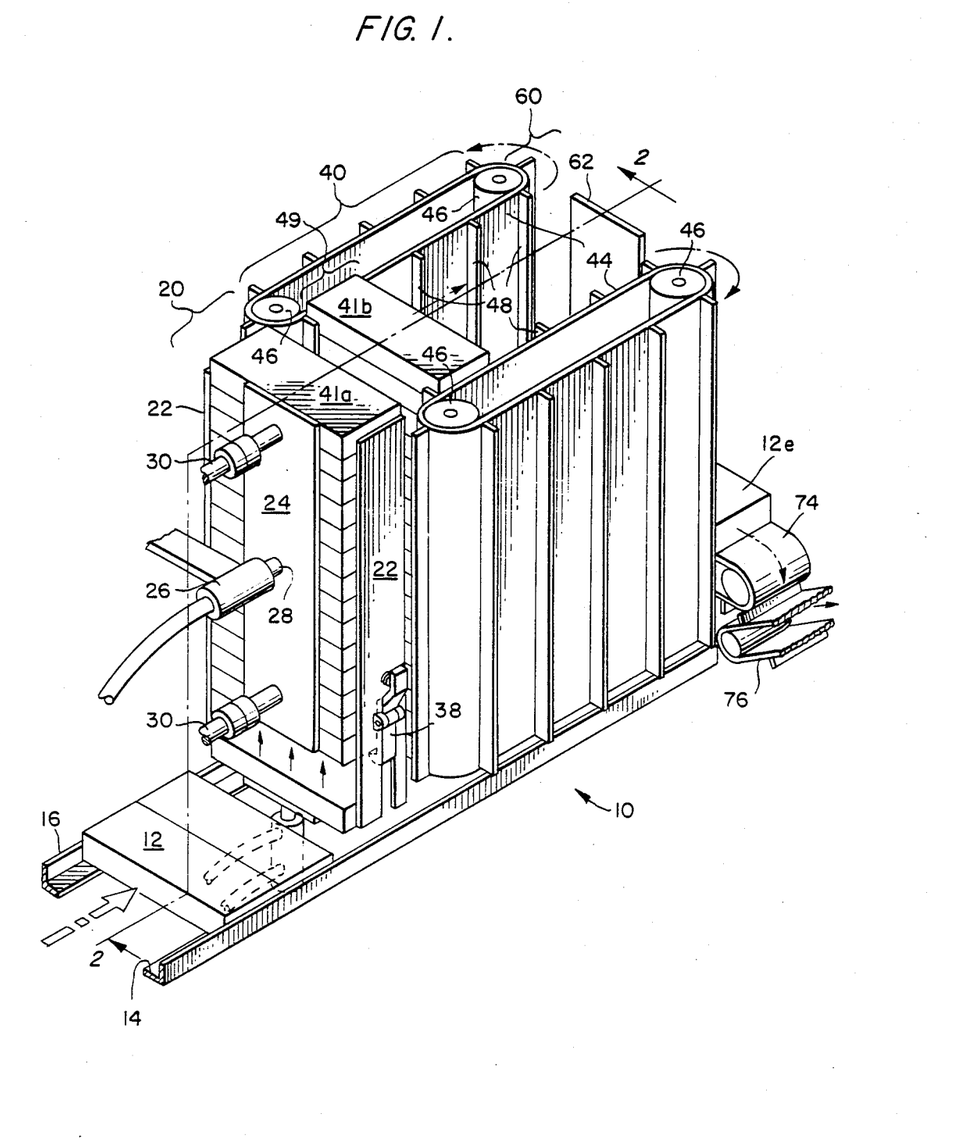
FIG. 1 is a pictorial of an embodiment of the invention.

FIG. 1 shows an embodiment of the present invention. As shown, this embodiment is directed to an automatic accumulator installed between a cigarette cartoning machine and a cigarette carton casing machine. The principle of this invention could be adapted easily to other applications, however, and it should be understood that many of the specific details depicted serve to adapt the invention to the particular environment specified.

The automatic accumulator 10 generally is mounted above a dead plate 14, across which flows a stream of cigarette cartons 12. Cartons are oriented transverse to the dead plate and are retained on the plate by guides 16. The stream travels by indexed movement, actuated by a plunger (not shown) adjacent the cartoning machine. Cartons abut one another in the stream so that the entire stream is pushed simultaneously. In normal operation, the stream flows under the automatic accumulator, and on each indexing motion the endmost carton is pushed onto an output conveyor 74 (FIG. 2) located at the end of the dead plate. Each indexing motion pushes the stream forward a distance approximately equal to the width of one carton.

The automatic accumulator comprises three major assemblies: an input magazine 20 occupies the end of the accumulator closest to the cartoning machine and receives cartons from the stream; a bin 40 extends forward toward the end of the dead plate and holds stacks of cartons; an output magazine 60 receives cartons from the bin and discharges them to the output conveyor.

The input magazine 20 receives cartons from the stream and stacks them for accumulation. Sidewalls 22 extend upward from the dead plate 14 to define the sides of the magazine. A loading plunger 24 defines the rear face of the magazine. This plunger is carried on rails 30, which are suitably journaled for sliding motion in support members (not shown) with motive power supplied by an air cylinder 26, connected to the plunger by a shaft 28. The lengths of shaft 28 and rails 30 are chosen to permit the plunger to travel between a retracted position in which the plunger forms the rear of the input magazine, forward for a distance approximately equal to the width of one carton. Movement in both directions may be controlled by direct application of air pressure, or the plunger may be urged into its retracted position by the action of a biasing spring (not shown), as may be selected. The primary purpose of the loading plunger is to push forward a stack of cartons, and dimensions of its components may be chosen to accomplish that task. This plunger should be sufficiently wide to push a stack forward without causing the stack to lose its transverse alignment. Thus, the plunger width may be chosen to be about three-quarters the width of a cigarette carton. The rails should be positioned to hold the plunger in alignment. Thus, it is preferred to use two rails, connected to the plunger on its vertical center line slightly inboard of the plunger top and bottom, as shown. The air cylinder must exert sufficient force to move the stack forward, and should be connected to the plunger at its center point.

A vertical plunger 32 is located directly below the input magazine. In the plunger's retracted position, the plunger face lies within an aperture in the dead plate, level with the plate surface, so that cartons may slide across the plunger with ease. The plunger is connected to an air cylinder 34 by shaft 36. The plunger may be retained in its retracted position by a spring or other suitable means (not shown).

Two latch assemblies 38 are mounted at the bottom of the sidewalls 22. These latches serve to accept cartons into the magazine and support them within it, and their design may be selected by those skilled in the art. In the embodiment shown, the latches are hook-like in form and spring loaded, so that the hook portion extends into the magazine. When a carton is pressed against the latches from below, the latches yield outwardly to allow the carton to pass, then are urged inwardly to support the carton.

Figure 4:
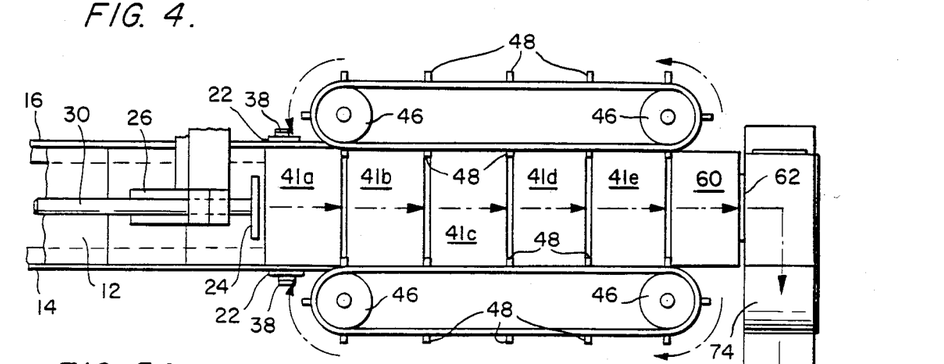
FIG. 4 is a plan view of the embodiment of FIG. 1.

The bin assembly 40 extends forward from the input magazine in the direction of indexed flow (FIGS. 1 and 4). Floor plate 42 forms the bottom of the bin, mounted above the dead plate at a distance slightly greater than the thickness of two cartons. Two powered belts 44 define the sides of the bin. Each belt carries flights 48, which define bays 49, each slightly greater than one carton wide. Most conveniently, the belts are of the type used in the food industry to convey articles up an incline, and they may be obtained with flights formed therein from sources readily available to the art. The belts are carried on vertically mounted rollers 46. One roller of each set is powered by drive means (not shown) such that the flights extending into the bin travel in the direction of indexed flow.

Figure 3:
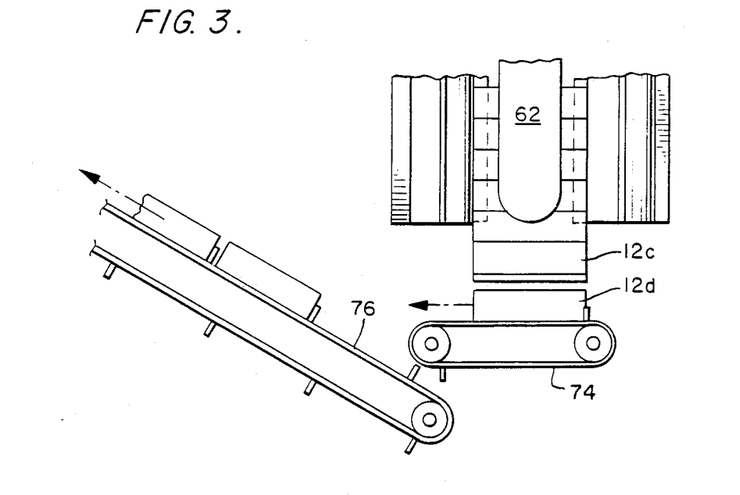
FIG. 3 is a partial view of the embodiment of FIG. 1, taken along Line 3, FIG. 2.

The output magazine 60 stands at the end of the bin and holds one stack of cartons for discharge onto the output conveyor 74. The bottom of the output magazine is formed by a step 61, located below the level of floor plate 42 at a distance approximately equal to the thickness of one carton. Stop plate 62 defines the end of the output magazine and holds the stack of cartons in place. The stop plate terminates at a level slightly above that of floor plate 42, thus defining discharge port 70 between the bottom of the stop plate and the level of step 61 (FIG. 3). A discharge plunger 64, fixed to a shaft 68, is mounted under the bay with its face adjacent the bottommost carton in the output magazine, leaving sufficient clearance under the output plunger for cartons to pass beneath it on the dead plate. Shaft 68 is mounted in air cylinder 66, which causes the output plunger to move horizontally from a retracted position adjacent the output magazine to an extended position approximately in the vertical plane of stop plate 62. The output plunger may be retained in its retracted position by suitable means, such as a biasing spring (not shown).

Figure 2:
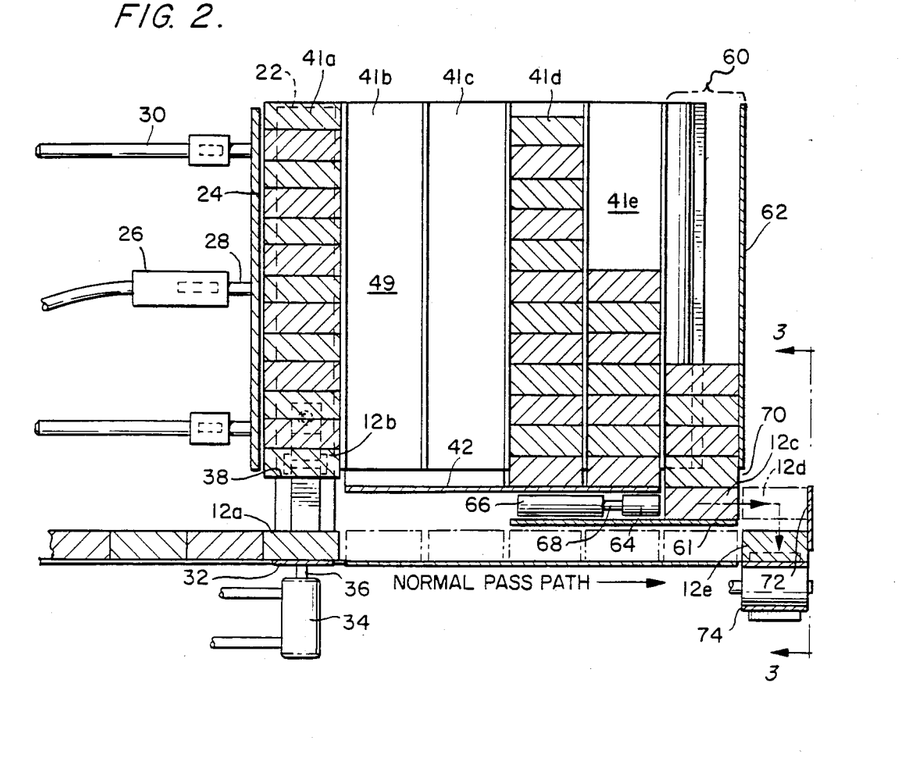
FIG. 2 is a side view of an embodiment of the invention, taken along Line 2, FIG. 1.

Means for receiving cartons fed both from the accumulator and from the indexed stream are located immediately beyond the end of the dead plate. Design of such means is influenced primarily by the path cartons must follow to reach the casing machine. Typically, transfer apparatus at this point in a cigarette manufacturing operation consists of conveyors or elevators. A combination of an output conveyor 74 and a casing conveyor 76, running at an incline, is shown. Here, the output conveyor runs transverse to the direction of indexed flow, but an alternate design could allow for cartons to travel parallel to that direction. As hereafter explained, the primary criterion for the output means is that it travel at a speed (measured in cartons per unit of time) twice that of the indexed flow. An output deflector 72 is mounted perpendicular to the output conveyor and slightly above it, in a plane corresponding to the outer edge of the conveyor, with its upper surface at a level slightly above that of the lowermost carton in the output magazine.

Several design parameters of the present invention can be altered to suit particular circumstances. Obviously, several parameters are dictated by the articles to be handled. For example, the accumulator width should be only slightly greater than the width of the articles to be handled. Similarly, the distance between flights 48 should be slightly greater than the width of the articles. Two key parameters, however, are the accumulator height and its length, and these factors are governed by operational considerations, discussed hereafter.

Operation of the invention will be discussed in two stages. First, the accumulator operation will be discussed generally. Then, the operation of the accumulator in concert with the remainder of the system will be addressed.

Accumulation of cartons begins with assembling a stack of cartons in the input magazine, under the direction of a control system, discussed hereafter. As best seen in FIG. 2, normal indexed flow across the dead plate 14 causes a carton 12a to move into position directly below input magazine 20, resting directly on the face of vertical plunger 32. This plunger is then actuated by air cylinder 34, which lifts the carton to position 12b. During movement, this carton strikes the lower faces of latches 38, which yield outwardly to allow the carton to pass and then close inwardly under the bottom of the carton. When the vertical plunger retracts, the carton is held in position 12b within the input magazine. The next indexing of the carton stream brings another carton to position 12a, and the vertical plunger cycle is reiterated. The first carton is thus forced upward into the input magazine, resting upon the second carton, which is retained in position by the latches. Repetition of this process forms a stack 41a of cartons in the input magazine. The stack is retained in vertical position by the loading plunger 24 and the initial set of flights 48.

When the input magazine stack has reached the desired height (as hereafter discussed), the stack is loaded into the accumulator bin. Loading plunger 24, actuated by cylinder 26, pushes the entire stack from the input magazine into the first bay 49, defined by flights 48, to position 41b. This movement is accompanied by simultaneous powered movement of the belts 44 so that the stack is at all times held in vertical position. Note that the loading plunger must be sufficiently narrow to allow clearance between flights 48. Positioning latches 38 slightly above the level of floor plate 42 facilitates the stack transfer into the bin. When the next stack 41a is formed in the input magazine, the loading plunger cycle is repeated. The flights to the rear of the first stack propel that stack forward to position 41c. Through repetitions of this cycle, the entire bin may be filled with stacks of cartons extending from positions 41b to position 41e.

Discharge of the accumulated cartons is begun by sliding the endmost stack 41e of cartons within the bin into the output magazine 60. As this stack moves from position 41e into the output magazine, it drops from the floor plate 42 to step 61, a distance approximately equal to the thickness of one carton. The stack is held in vertical alignment by the powered belt flight and the stop plate 62. At this point, the lowermost carton in the output magazine is at position 12c (FIG. 3). Upon actuation of the output plunger 64 by air cylinder 66, this carton is impelled through discharge port 70 outward to position 12d, where it strikes deflector 72 and drops onto the output conveyor 74 at position 12e. Note that the output plunger upper surface must be flat and of sufficient length to allow the next carton in the output magazine to be supported during the plunger stroke and then to drop smoothly into discharge position 12c. Subseqeunt iterations of this cycle unload the output magazine, which then receives the next stack of cartons to be discharged.

Figure 5A:
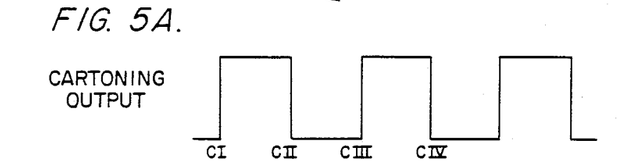
FIGS. 5A–E are timing diagrams of the embodiment of FIG. 1.
Figure 5B:
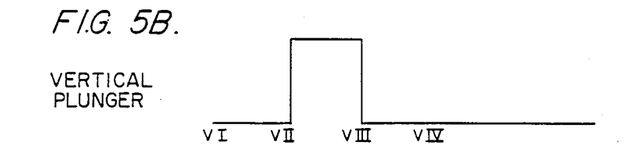
Figure 5C:
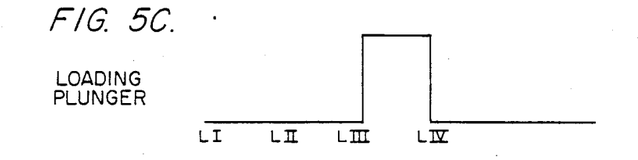
Figure 5D:
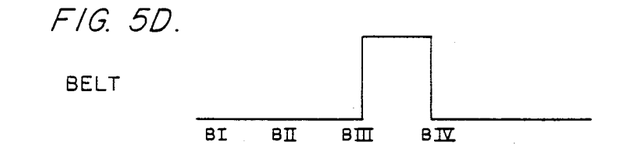
Figure 5E:
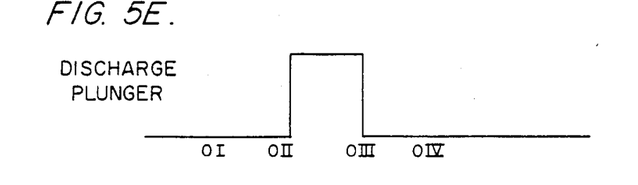
Figure 6:
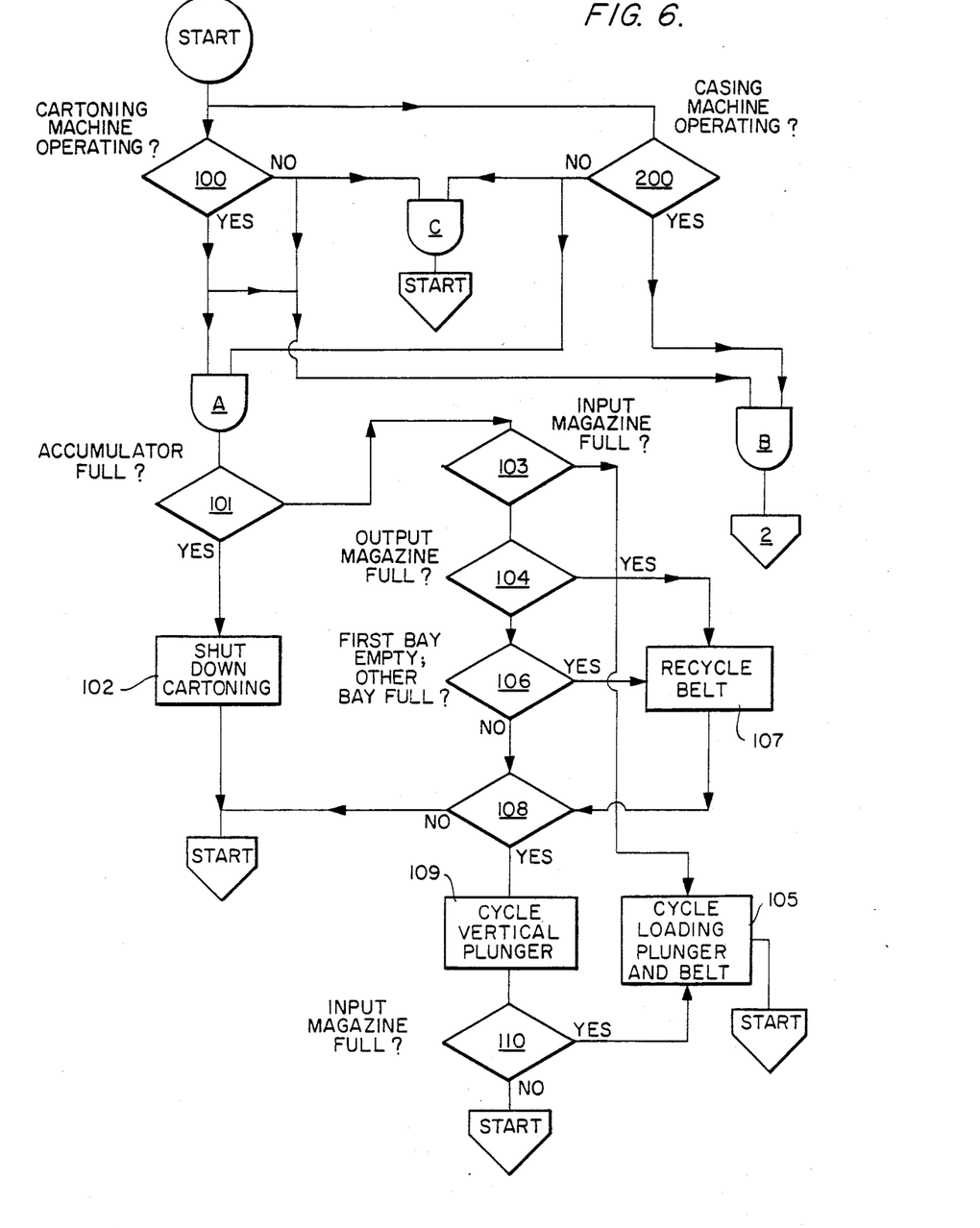
FIGS. 6 and 7 are a flow chart showing operation of the embodiment of FIG. 1.
Figure 7:
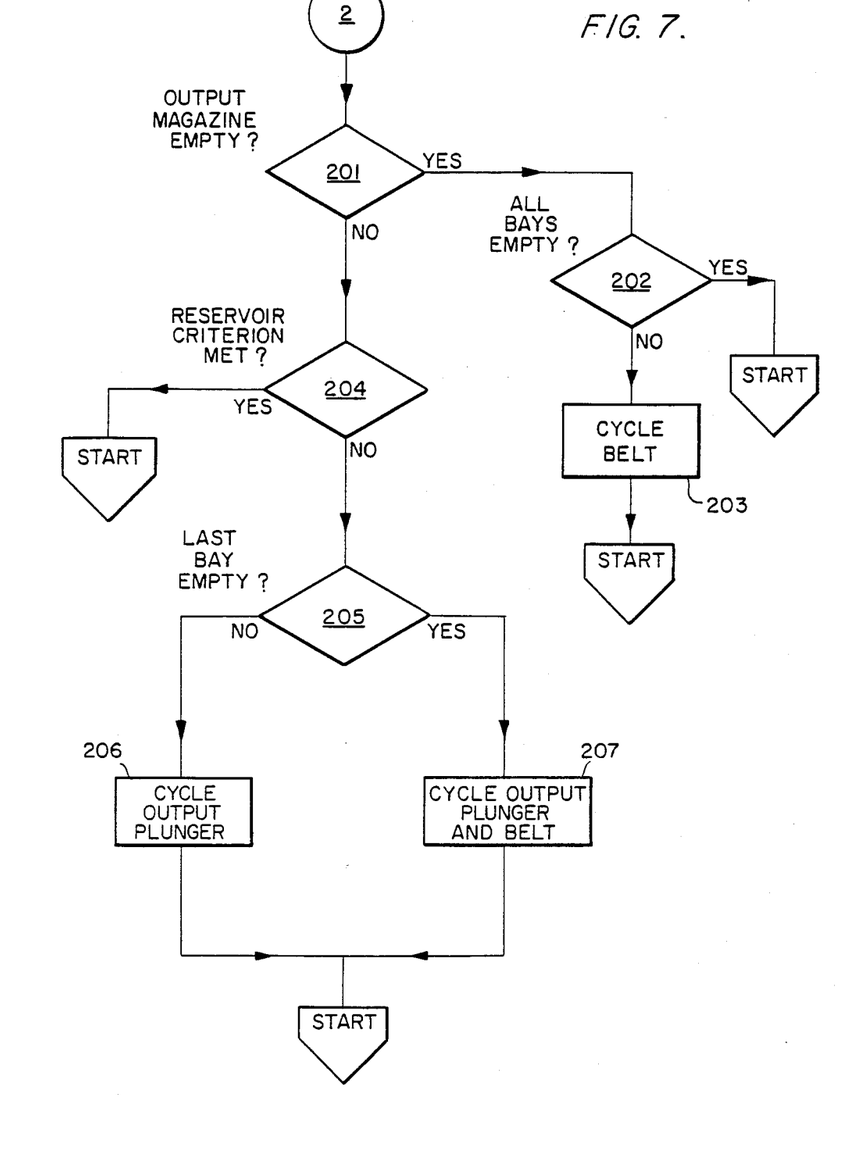

Operation of the accumulator in conjunction with the cartoning and casing machines can best be understood with reference to the logic diagram of FIG. 6 and 7 and the timing diagram of FIG. 5. The machine logic shown can be implemented in any number of ways. For example, a combination of switches and solenoids could be used to establish the various logical paths. Alternatively, the system could be part of a microprocessor-based process control system, either standing alone or as part of a larger control system. For purposes of clarity, the machine logic is depicted in flowchart format.

Whatever components are used, however, status signals must be obtained from six areas. First, it must be determined whether the input and output conveyor systems (from the cartoning machine and to the casing machine respectively) are functioning. Then, it must be ascertained whether the input magazine, output magazine, and bays are filled, and whether a carton is positioned on the vertical plunger. This information may be gathered by conventional sensor means, such as feeler switches or photocells.

Timing for the system is based upon the operation of the cartoning machine output. As seen in FIGS. 5A-C, cartoning output operates an approximately a 50% duty cycle. That is, about half of a cycle is taken up by movement of cartons on the dead plate toward the accumulator (CI-CII), and half a cycle (CII-CIII) is wait time. As will become clear, timing signals based upon these periods must be provided whether or not the cartoning system is in operation.

Three machine logic pathways may be identified on FIGS. 6 and 7, based upon the status of the cartoning machine and casing machine. The system receives these status signals (blocks 100 and 200), performs a logical AND operation upon them (blocks A, B, and C), and sets the control means accordingly. Path A, beginning at block A, is followed if the cartoning machine is operational but the casing machine is down. Path B shown flowing from block B is followed if the casing machine is operational, regardless whether the cartoning machine is operational or not. Path C, beginning at block C, occurs when both the cartoning and casing machines are interrupted.

Accumulation of cartons occurs when the system follows Path A, when the cartoning machine is in operation and the casing machine goes down (block A). In this event, the system first looks to the accumulator to determine whether it is full; if it is, the cartoning machine is shut down until a status change occurs (blocks 101-102). If not, the next step depends upon the status of the input magazine (block 103). If it is full, the loading plunger and belt are cycled (block 105), and the system loops back to start ("Start" connector). A "no" answer at this step requires the system to determine whether the output magazine is full (block 104). If it is, the contents of the input magazine will not be able to be moved forward into the bin, because the output stack prevents the belt from advancing. This problem is circumvented by causing the belts to recycle, (that is, the inner surfaces move toward the input magazine) moving the output stack (except for the bottom carton, which remain on the step) back into the bin (block 107). Even if the output magazine is not full, however, the belt is also recycled if the first bay is empty but others are loaded (block 106), to insure that the bin is configured to receive a full load of cartons. Next, if a carton is in position over the vertical plunger (block 108), that plunger is cycled (block 109), inserting the carton into the input magazine. The input magazine status is again checked (block 110), and the loading plunger and belt are cycled if necessary to clear the input magazine (block 105). At the termination of each of these alternative pathways, the system loops back to "Start" to begin a new cycle ("Start" connectors). Note the timed relationship of these steps, as shown in FIG. 5. Assuming, for example, that the cartoning machine is operating, the casing machine is down, and that one additional carton may be loaded into the magazine; the system then operates in the following sequence. During time CI-CII, the cartoning output plunger indexes, causing the stream of articles traveling on the dead plate to move forward and positioning the lead carton over the vertical plunger. Also during this period, various system controls are set as a result of the operations shown in FIG. 6, blocks A, 101, 103, and 104. During the cartoning output plunger wait time (CII-CIII), the vertical plunger pushes the lead carton upward into the input magazine (VII-VIII). Because this operation fills the input magazine, the loading plunger indexes horizontally and belts move the flights forward one bay to slide the stack of cartons from the input magazine to the first bay (blocks 110-105, FIG. 6). This operation occurs during the cartoning output cycle CIII-CIV, as shown at LIII-LIV. Thus, during accumulation of cartons, the cartoning output and the accumulator loading plunger operate simultaneously, and the vertical plunger operates during the wait time.

If the casing machine is operating, the system follows logical path B, starting at block B of FIG. 6 (extending onto FIG. 7 through connectos 2). This path is followed whether or not the cartoning machine is operational (note connections to block B, FIG. 6). In this situation, the system first checks whether the output magazine is empty (block 201). If it is empty, and all bays are not empty (block 202), the belt is cycled, sliding stacks of cartons forward in the bay (block 203). This loop is reiterated until the output magazine is loaded.

Upon receiving a "no" at block 201, a reservoir criterion, depicted at block 204, may or may not be included in the system, depending upon whether one wishes to leave a certain number of cartons in the accumulator to allow the casing system to continue operation during interruptions of the cartoning machine. If experience shows that the cartoning machine seldom experiences downtime, one may wish to unload the accumulator completely whenever the casing machine is operating. Conversely, one may decide to leave one or more stacks within the accumulator, based upon cartoning machine interruption data. For example, if it were decided to leave one stack of cartons in the accumulator when both machines were running, the system would test for that condition at block 204. If the criterion were met, the system would loop back to Start.

After obtaining a "no" answer at block 204, the system checks the last bay, at block 205. If it is empty, both the belt and the output plunger are cycled, block 207; if not, only the output plunger is cycled, block 206. As seen in FIGS. 5A and 5E, the disharge plunger operates (OII-OIII) during the cartoning output wait time (CII-CIII), coincident with operation of the vertical plunger.

The timing relationship between the discharge plunger and the cartoning output plunger enables the system to make up casing machine production lost due to downtime. While the casing machine is down, cartons are loaded into the accumulator. After the casing machine resumes operation, cartons again move in indexed flow across the dead plate to the output conveyor. Upon reaching the end of the dead plate, one carton is ejected onto the output conveyor during each duty cycle of the cartoning output (CI-CII, CIII-CIV). At the same time, the accumulator belt also operates during each duty cycle until the output magazine is loaded. Then, the discharge plunger begins operating during cartoning output wait cycles, e.g., OII-OIII. Because the output conveyor is moving at twice the rate (in cartons per minute) of the dead plate stream, spaces are left on the output conveyor between each carton ejected from the dead plate, and into these spaces, the discharge plunger ejects cartons from the output magazine. Thus, during the time when the accumulator is being unloaded and the cartoning apparatus is operating, the system can provide the casing stage with twice as many cartons per minute as does the cartoning machine alone. The casing apparatus, with its greater throughput capacity, can absorb this added input, making up for lost production.

Many design criteria of this system may be selected by those having skill in the art without departing from the spirit of the present invention. for example, the machine logic may be implemented to suit particular situations. Also, the accumulator capacity, physical arrangement, and reservoir criterion may be chosen based upon actual downtime data. Apparatus for conveying articles to and from the accumulator similarly should be selected and arranged to fit the operating environment. These and other changes may be made within the scope of this invention, which is defined only by the claims appended hereto.

We claim:

1. An automatic accumulator for articles moving in an indexed stream, which allows a system to continue operation during interruptions in operation of either a receiving machine or a supplying machine and allows a receiving machine to make up lost production time, comprising:

vertical plunger means, positioned contiguous the path of the indexed stream, for sequentially lifting articles out of the stream;

input magazine means, disposed above said vertical plunger for holding and retaining sequentially lifted articles in a stack;

loading plunger means, adjacent said input magazine means, having powered means for imparting a linear motion to said stack;

bin means positioned adjacent said path of the indexed stream, having one end adjacent said input magazine, having at least one stack bay, and including support means for retaining said stack in vertical position and for moving said stack within said bin means;

output magazine means, adjacent the opposite end of said bin, dimensioned to accept a said stack, having a discharge port formed therein;

discharge plunger means disposed such that the stroke axis thereof passes through the position of the lowermost article in said output magazine and through said discharge port;

output conveyor means disposed to accept articles both from the indexed stream and from said discharge port, said output conveyor means travelling at least twice as fast as the indexed stream; and control means for regulating the operation of the accumulator.

2. The accumulator of claim 1, wherein said bin includes:

two endless belts, vertically mounted to define the sides of said bin;

a plurality of flights carried on said belts, defining stack bays therebetween;

two pairs of vertically mounted rollers carrying said belts;

a floor plate; and means for driving at least one roller in each said pair.

3. The accumulator of claim 1, wherein the accumulator is mounted above and parallel to the indexed stream.

* * * * *